(12) United States Patent
Duyvesteyn

(10) Patent No.: US 12,338,509 B2
(45) Date of Patent: *Jun. 24, 2025

(54) BYPRODUCT SCANDIUM RECOVERY FROM LOW GRADE PRIMARY METAL OXIDE ORES

(71) Applicant: Scandium International Mining Corp., Sparks, NV (US)

(72) Inventor: Willem P. C. Duyvesteyn, Reno, NV (US)

(73) Assignee: Scandium International Mining Corporation, Reno, NV (US)

( * ) Notice: Subject to any disclaimer, the term of this patent is extended or adjusted under 35 U.S.C. 154(b) by 1169 days.

This patent is subject to a terminal disclaimer.

(21) Appl. No.: 16/998,415

(22) Filed: Aug. 20, 2020

(65) Prior Publication Data

US 2021/0172041 A1 Jun. 10, 2021

Related U.S. Application Data

(60) Provisional application No. 62/889,207, filed on Aug. 20, 2019.

(51) Int. Cl.
| | | |
|---|---|---|
| C22B 59/00 | (2006.01) | |
| C22B 1/00 | (2006.01) | |
| C22B 3/00 | (2006.01) | |
| C22B 3/08 | (2006.01) | |
| C22B 3/42 | (2006.01) | |
| C22B 3/44 | (2006.01) | |

(Continued)

(52) U.S. Cl.
CPC ............. *C22B 59/00* (2013.01); *C22B 1/005* (2013.01); *C22B 3/08* (2013.01); *C22B 3/42* (2013.01); *C22B 3/44* (2013.01); *C22B 15/0071* (2013.01); *C22B 23/043* (2013.01); *C22B 26/12* (2013.01); *C22B 34/1213* (2013.01); *C22B 34/22* (2013.01)

(58) Field of Classification Search
CPC ........... C22B 59/00; C22B 1/005; C22B 3/08; C22B 3/42; C22B 3/44; C22B 15/0071; C22B 23/043; C22B 26/12; C22B 34/1213; C22B 34/22
USPC ........................................................ 423/21.1
See application file for complete search history.

(56) References Cited

U.S. PATENT DOCUMENTS 3,214,239 A 10/1965 Hazen et al.
5,049,363 A 9/1991 Feuling
(Continued)

OTHER PUBLICATIONS

Angelov, T. et al. (2000). The Successful Commercial Implementation of the Combined Leach—Ion Exchange—Solvent Extraction—Electrowinning Process at the Bucim Copper Project. University of Mining and Geology "St. Ivan Rilski", Bulgaria.
(Continued)

*Primary Examiner* — Melissa S Swain
(74) *Attorney, Agent, or Firm* — John A. Fortkort; Fortkort & Houston PC

(57) ABSTRACT

A method for extracting metal values from a low grade primary metal oxide ore feedstock is provided. The method includes providing a low grade primary metal oxide ore containing a primary metal and scandium; subjecting the ore to acid leaching, thus yielding an acidic leachate; extracting the primary metal and scandium from the leachate, thereby yielding an acidic barren leachate; and using the acidic barren leachate in a subsequent iteration of the acid leaching step.

15 Claims, 2 Drawing Sheets

(51) Int. Cl.
*C22B 15/00* (2006.01)
*C22B 26/12* (2006.01)
*C22B 34/12* (2006.01)
*C22B 34/22* (2006.01)

(56) References Cited

U.S. PATENT DOCUMENTS

| | | | |
|---|---|---|---|
| 6,440,383 | B1 | 8/2002 | Duyvesteyn et al. |
| 8,372,367 | B2 | 2/2013 | Duyvesteyn |
| 8,986,424 | B2 | 3/2015 | Nebeker |
| 9,068,247 | B2 | 6/2015 | Marston et al. |
| 9,410,227 | B2 | 8/2016 | Boudreault et al. |
| 9,677,155 | B2 | 6/2017 | Mihaylov et al. |
| 9,982,325 | B2 | 5/2018 | Duyvesteyn |
| 9,982,326 | B2 * | 5/2018 | Duyvesteyn .............. C22B 3/26 |
| 11,673,812 | B2 * | 6/2023 | Duyvesteyn .............. C22B 3/08 423/24 |
| 2006/0222580 | A1 | 10/2006 | Tinkler et al. |
| 2011/0182786 | A1 * | 7/2011 | Burba, III ............... C22B 23/00 423/90 |
| 2011/0298270 | A1 | 12/2011 | Duyvesteyn |
| 2012/0204680 | A1 | 8/2012 | Duyvesteyn |
| 2012/0207656 | A1 | 8/2012 | Duyvesteyn |
| 2012/0263637 | A1 | 10/2012 | Duyvesteyn |
| 2015/0104361 | A1 | 4/2015 | Boudreault et al. |
| 2015/0307966 | A1 | 10/2015 | Voight et al. |
| 2016/0145714 | A1 * | 5/2016 | Liddell ................. C01B 7/0718 75/421 |
| 2016/0153070 | A1 | 6/2016 | Duyvesteyn |
| 2016/0289795 | A1 | 10/2016 | Duyvesteyn |
| 2018/0030577 | A1 | 2/2018 | Duyvesteyn |

OTHER PUBLICATIONS

Copp, R. (2016). Recovery of Yttrium and Neodymium From Copper Pregnant Leach Solutions by Solvent Extraction. The University of Arizona.

Sole, K. et al. (2016). Recovery of copper from Chilean mine waste waters. Mining Meets Water—Conflicts and Solutions IMWA 2016 Proceedings.

Sole, K. et al. (2016). Present and future applications of ion exchange in hydrometallurgy: An overview. Society of Chemical Industry—IEx 2016 Proceedings.

Kordosky, G.A. (2002). Copper recovery using leach/solvent extraction/electrowinning technology: Forty years of innovation, 2.2 million tonnes of copper annually. The Journal of The South African Institute of Mining and Metallurgy.

Lu, B. C., Graydon, W. F. (1954). The Rate Of Dissolution Of Copper. Canadian Journal of Chemistry, 32(2), 153-163. doi:10.1139/v54-022.

* cited by examiner

BYPRODUCT SCANDIUM RECOVERY FROM LOW GRADE PRIMARY METAL OXIDE ORES

CROSS-REFERENCE TO RELATED APPLICATION

This application claims the benefit of priority from U.S. provisional application No. 62/889,207, filed Aug. 20, 2019, having the same inventor, and the same title, and which is incorporated herein by reference in its entirety.

FIELD OF THE DISCLOSURE

The present disclosure relates generally to systems and methodologies for the recovery of metal values, and more particularly to systems and methodologies for the recovery of scandium values as a byproduct to the recovery of metal values from low grade primary metal oxide ores.

BACKGROUND OF THE DISCLOSURE

Scandium alloys are known to have several advantages which make them desirable in various commercial uses. Unfortunately, the widespread use of scandium has been hampered by the low availability (and consequently high cost) of the metal. Although scandium is not a particularly rare metal in terms of its abundance in the Earth's crust, there are currently no known, easily extractable deposits of minerals which contain high concentrations of the metal.

This situation may be appreciated with respect to FIG. 1, which depicts the Clarke number for various metals. The Clarke number represents the abundance of elements in the Earth's crust. As seen therein, Sc is a relative abundant element with an average value of about 20 ppm. Indeed, the gross commercial value of the 20 ppm scandium in the crust is approximately $60/ton material, based on a scandium oxide market price of $2,000/kg oxide. However, much of this scandium is locked up in complex silicates, making its recovery very costly. It would thus be uneconomical to directly process earth crust material for scandium recovery.

SUMMARY OF THE DISCLOSURE

A method for extracting metal values from a low grade primary metal oxide ore feedstock is provided. The method comprises (a) providing a low grade primary metal oxide ore containing a primary metal and scandium; (b) subjecting the ore to acid leaching, thus yielding an acidic leachate; (c) extracting the primary metal and scandium from the leachate, thereby yielding an acidic barren leachate; and (d) using the acidic barren leachate in a subsequent iteration of the acid leaching step.

DETAILED DESCRIPTION

Figure 1:
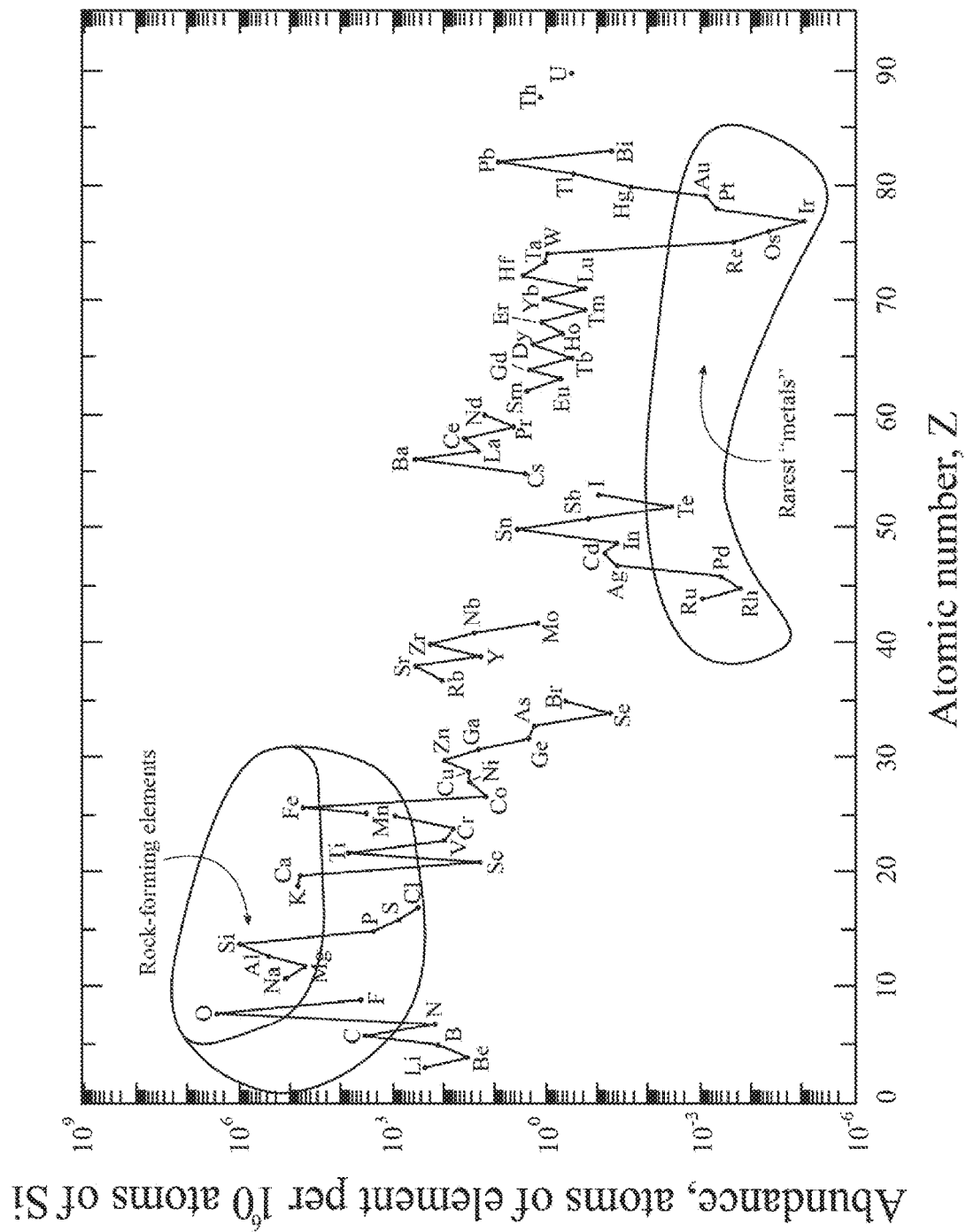
FIG. 1 is a diagram illustrating the relative abundance of various metals in the Earth's crust.

The Earth's crust is exposed to various weathering processes, which may be generally classified as physical, chemical, or biological weathering processes. These processes result in the breakdown of rocks at the earth's surface, typically by the action of rainwater, oxygen, temperature extremes, and biological activity.

Weathering processes can have a significant impact on the economics of scandium recovery from the Earth's crust. For example, chemical or biological weathering processes can result in the chemical breakdown of complex silicates, thereby enhancing the possible dissolution of scandium from matrix materials through the use of appropriate lixiviants (such as, for example, sulfuric acid). It is notable that scandium values are typically locked up in only a few specific silicates, and the distribution of scandium in these silicates is uneven. Thus, while pyroxenites may contain as much as 1,000 ppm Sc, hornblende typically contains no more than 400 ppm Sc, and biotites are limited to about 100 ppm Sc. Oxide ores may contain 0.5 to 10% of these scandiferous minerals.

Oxidic metal ores, such as copper, vanadium, lithium and titanium, have not been thoroughly investigated for the potential co-production of byproduct scandium, as this phenomenon is not well known. However, it has been found that the co-production of byproduct scandium from these materials can have a significant impact on the overall economic feasibility of isolating these metals. Thus, for example, if it is assumed that weathering processes can liberate about 25% of the contained Clarke value of 20 ppm Sc, the economic contribution of producing scandium byproduct is significant, as summarized in TABLE 1 below. TABLE 1 thus demonstrates that scandium can potentially make a major contribution to the economics of processing certain oxide ores for primary metal recovery such as, for example, copper, nickel, titanium, vanadium or lithium.

TABLE 1

| Oxide Ore Type | Symbol | Economic Content (%) | Product | Product Price ($ per ton) | Value per Ton of Ore ($) | Value of 5 ppm Sc | Ratio Sc/Me ($) |
|---|---|---|---|---|---|---|---|
| Copper | Cu | 0.25 | Cu | 6,000 | 15 | 15 | 100 |
| Vanadium | V | 0.25 | $V_2O_5$ | 19,000 | 48 | 15 | 31 |
| Lithium | Li | 0.60 | $Li_2CO_3$ | 10,000 | 60 | 15 | 25 |

Sulfuric acid is the preferred lixiviant for processing oxide ores. The consumption of acid is not only governed by the solubilization of the metal of interest, but also by the presence of gangue minerals that have an acid neutralizing or consuming capacity. Weathered minerals that contain magnesium, iron, calcium and aluminum consume significant amounts of acid. Since acid requirements may amount to over 50% of the total operating costs of metal recovery, optimizing or minimizing acid consumption is typically a major focus of metal oxide projects.

Unfortunately, approaches which minimize acid consumption (so-called "starved" acid approaches) may also limit the dissolution of the primary metal. As a result, the primary metal recovery experienced with such approaches is often limited to only about 70%.

On the other hand, dissolution of scandium from weathered oxide ores also requires a certain amount of acid. It has been found that, when greater amounts of acid are used in metal oxide extractions, higher scandium extraction occurs as well. Consequently, the costs associated with higher acid usage may be offset by the value of the potential scandium byproduct if this byproduct is recovered. Moreover, the use of greater amounts of acid frequently result in improved primary metal extraction, often to levels that approach 90%.

Figure 2:
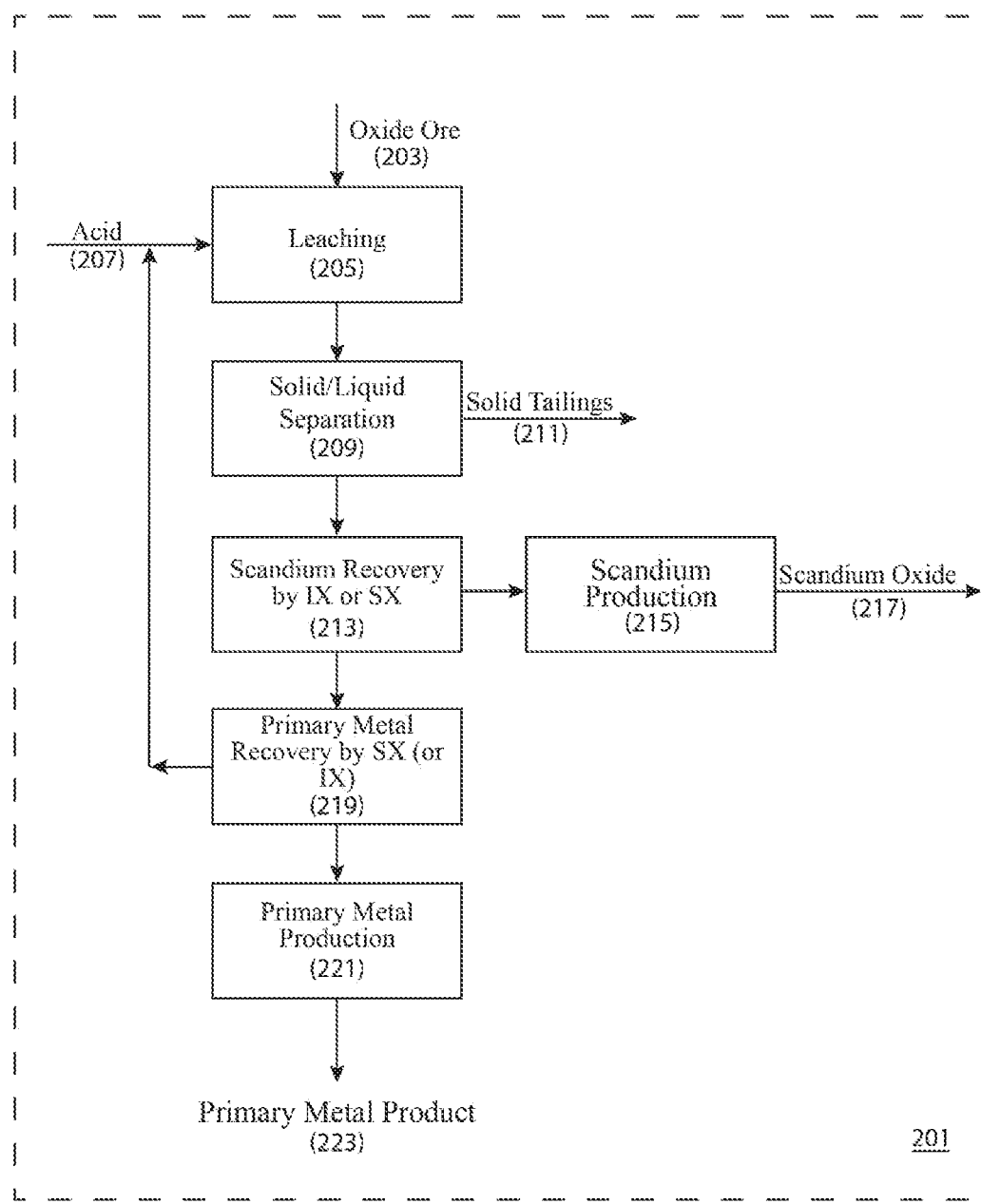
FIG. 2 is a flow chart depicting an embodiment of a method for recovering scandium values from low grade primary metal oxide ores in accordance with the teachings herein.

FIG. 2 depicts a particular, nonlimiting embodiment of a generic processing route to selectively recover a primary metal and scandium from a metal oxide ore in accordance with the teachings herein. With reference thereto, the method 201 commences with the provision of a metal oxide ore feedstock 203 which may come, for example, from a mining operation or an industrial process. The ore feedstock in this embodiment contains at least one primary metal and scandium. The primary metal may be, for example, vanadium, copper, nickel, titanium or lithium. In some embodiments, prior to further processing, the ore feedstock may be subjected to size reduction as, for example, through initial crushing followed by high pressure grinding roll (HPGR) crushing.

The ore feedstock is then subjected to leaching 205 with an acid 207, and preferably with sulfuric acid. In some embodiments, the leaching step may include vat leaching or tank leaching. The leaching step is followed by solid/liquid separation 209, which generates a leachate and solid tailings 211.

The leachate is then subjected to scandium recovery 213. This typically involves the use of ion exchange (IX) or solvent extraction (SX) to isolate scandium from the leachate. The isolated scandium is then subjected to scandium production 215, which preferably involves the generation of scandium oxide 217.

After removal of the scandium values, the scandium barren leachate is subjected to primary metal recovery 219. This typically involves the use of ion exchange (IX) or solvent extraction (SX) to isolate the primary metal from the leachate. The isolated primary metal is then subjected to primary metal production 221, which involves the generation of a primary metal product 223. The acidic leachate remaining from primary metal extraction, which is now barren with respect to both scandium and the primary metal, may be utilized in the leaching step 205 of a subsequent iteration of the process.

Various modifications are possible to the systems and methodologies disclosed herein. For example, in the embodiment depicted in FIG. 2, scandium recovery occurs before primary metal recovery. However, in other embodiments, primary metal recovery may precede scandium recovery.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. In these claims, absent an explicit teaching otherwise, any limitation in any dependent claim may be combined with any limitation in any other dependent claim without departing from the scope of the invention, even if such a combination is not explicitly set forth in any of the following claims.

What is claimed is:

1. A method for extracting metal values from a low grade primary metal oxide ore feedstock, comprising:
   providing a low grade primary metal oxide ore feedstock containing a primary metal and scandium;
   subjecting the ore to acid leaching, thus yielding an acidic leachate;
   extracting the primary metal and scandium from the leachate, thereby yielding an acidic-barren leachate; and
   using the acidic barren leachate in a subsequent iteration of the acid leaching step.

2. The method of claim 1, wherein extracting the primary metal from the leachate includes at least one process selected from the group consisting of ion exchange and solvent extraction.

3. The method of claim 1, wherein extracting scandium from the leachate includes at least one process selected from the group consisting of ion exchange and solvent extraction.

4. The method of claim 1, wherein the primary metal is extracted before scandium is extracted.

5. The method of claim 1, wherein the primary metal is copper.

6. The method of claim 1, wherein the acid leaching step involves the use of sulfuric acid.

7. The method of claim 1, further comprising a pretreatment step of the ore feedstock involving size reduction through crushing.

8. The method of claim 1, wherein the acid leaching step includes controlling the temperature within a specific range.

9. The method of claim 1, wherein the leachate from the acid leaching step is further treated to adjust its pH before the extraction of the primary metal and scandium.

10. The method of claim 1, further including purifying the extracted scandium to produce scandium oxide.

11. The method of claim 1, wherein the barren leachate used in a subsequent iteration of the acid leaching step is further treated to replenish its acidity level.

12. The method of claim 1, including an additional recovery step to reclaim residual primary metal or scandium from the acidic barren leachate before its reuse in the leaching step.

13. The method of claim 1, wherein the extraction of the primary metal and scandium from the leachate employs a sequential ion exchange process that preferentially binds the primary metal first, followed by scandium.

14. The method of claim 1, wherein the acid leaching step is performed in a controlled atmosphere.

15. The method of claim 1, wherein the method is applied to ore feedstock which is derived from a mining operation and which contains concentrations of both the primary metal and scandium.

* * * * *